(12) United States Patent
Han et al.

(10) Patent No.: US 11,126,345 B2
(45) Date of Patent: Sep. 21, 2021

(54) ELECTRONIC DEVICE COMPRISING TOUCH SCREEN AND OPERATION METHOD THEREOF

(71) Applicant: SAMSUNG ELECTRONICS CO., LTD., Suwon-si (KR)

(72) Inventors: Min-Seok Han, Seoul (KR); Dong-Seok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/497,049

(22) PCT Filed: Mar. 27, 2018

(86) PCT No.: PCT/KR2018/003609
§ 371 (c)(1),
(2) Date: Sep. 24, 2019

(87) PCT Pub. No.: WO2018/182295
PCT Pub. Date: Oct. 4, 2018

(65) Prior Publication Data
US 2020/0097153 A1 Mar. 26, 2020

(30) Foreign Application Priority Data
Mar. 27, 2017 (KR) .......... 10-2017-0038562

(51) Int. Cl.
*G06F 3/0488* (2013.01)
*G06F 3/0481* (2013.01)

(52) U.S. Cl.
CPC .......... *G06F 3/0488* (2013.01); *G06F 3/0481* (2013.01)

(58) Field of Classification Search
CPC .......... G06F 3/14; G06F 3/1455; G06F 3/147; G06F 3/0488; G06F 3/0481;
(Continued)

(56) References Cited

U.S. PATENT DOCUMENTS

| 1,713,620 A | 5/1929 | Pauk | |
| 2010/0020086 A1* | 1/2010 | Suzuki | ...................... G06F 3/14 345/502 |

(Continued)

FOREIGN PATENT DOCUMENTS

| KR | 10-2011-0122004 A | 11/2011 |
| KR | 10-2014-0026968 A | 3/2014 |

(Continued)

OTHER PUBLICATIONS

International Search Report (PCT/ISA/210) dated Jun. 27, 2018 by the International Searching Authority in counterpart International Patent Application No. PCT/KR2018/003609.

(Continued)

*Primary Examiner* — Ke Xiao
*Assistant Examiner* — James S Nokham
(74) *Attorney, Agent, or Firm* — Sughrue Mion, PLLC

(57) ABSTRACT

A first electronic device according to various embodiments of the present invention comprises: a communication module; a touch screen; and a processor, wherein the processor receives first data, from a second electronic device registered with the first electronic device, representing the second electronic device via the communication module, and, in response to the movement of the second electronic device to the touch screen, displays second data, corresponding to the first data, on a first area of the touch screen corresponding to the movement of the second electronic device.

15 Claims, 18 Drawing Sheets

(58) Field of Classification Search
CPC ........ G06F 2203/0384; H04L 12/2809; H04N 21/42222; H04N 21/482; H04M 1/72412
See application file for complete search history.

(56) References Cited

U.S. PATENT DOCUMENTS

| | | | | |
|---|---|---|---|---|
| 2010/0306798 | A1* | 12/2010 | Ahn | H04N 21/47217 725/38 |
| 2010/0317332 | A1* | 12/2010 | Bathiche | H04N 21/42222 455/418 |
| 2011/0268218 | A1 | 11/2011 | Kang et al. | |
| 2014/0057565 | A1 | 2/2014 | Kim et al. | |
| 2014/0223313 | A1 | 8/2014 | Aebi | |
| 2014/0306865 | A1* | 10/2014 | Pan | G06F 3/1423 345/2.1 |
| 2015/0062433 | A1* | 3/2015 | Wang | H04N 21/4316 348/564 |
| 2015/0067540 | A1 | 3/2015 | Yang et al. | |
| 2015/0172594 | A1* | 6/2015 | Takada | H04N 5/775 386/219 |
| 2015/0326704 | A1* | 11/2015 | Ko | H04L 12/2809 455/456.3 |
| 2016/0085497 | A1* | 3/2016 | Kim | G06F 3/1423 345/1.3 |
| 2016/0132280 | A1* | 5/2016 | Tomonaga | G06F 3/147 345/502 |
| 2017/0277902 | A1* | 9/2017 | Bae | G06F 3/1454 |
| 2018/0004684 | A1* | 1/2018 | Ihara | G06F 3/14 |

FOREIGN PATENT DOCUMENTS

| | | |
|---|---|---|
| KR | 10-2015-0026303 A | 3/2015 |
| KR | 10-2015-0116894 A | 10/2015 |
| WO | 2016/117194 A1 | 7/2016 |

OTHER PUBLICATIONS

Written Opinion (PCT/ISA/237) dated Jun. 27, 2018 by the International Searching Authority in counterpart International Patent Application No. PCT/KR2018/003609.

* cited by examiner

ELECTRONIC DEVICE COMPRISING TOUCH SCREEN AND OPERATION METHOD THEREOF

CROSS-REFERENCE TO RELATED APPLICATIONS

This application is a National Phase Entry of PCT International Application No. PCT/KR2018/003609, which was filed on Mar. 27, 2018, and claims priority to Korean Patent Application No. 10-2017-0038562, which was filed on Mar. 27, 2017, the content of each of which are incorporated herein by reference.

TECHNICAL FIELD

The present disclosure relates to an electronic device including a touch screen which displays information about an external electronic device, and a method of operating the electronic device.

BACKGROUND ART

Electronic devices equipped with large displays have been actively developed in recent years.

Existing electronic devices including large displays have to go through a plurality of menu processing steps starting from login in order to allow a user to check desired information. Moreover, the existing electronic devices including large displays provide user information through a user interface of a limited shape and size.

In addition, when a plurality of users use an existing electronic device including a large display, the existing electronic device has limitations in accurately distinguishing the users from each other. Accordingly, the existing electronic device including a large display has low usability when the plurality of users check their information.

DETAILED DESCRIPTION OF THE INVENTION

Technical Problem

According to various embodiments of the present disclosure, an electronic device and a method of operating the electronic device may be provided, in which information related to an external electronic device is displayed in an area corresponding to a movement of the external electronic device with respect to a touch screen included in the electronic device in response to the movement of the external electronic device.

Technical Solution

According to various embodiments of the present disclosure, a first electronic device includes a communication module, a touch screen, and a processor configured to receive, from a second electronic device registered to the first electronic device, first data indicating the second electronic device through the communication module, and display second data corresponding to the first data in a first area of the touch screen, corresponding to a movement of the second electronic device with respect to the touch screen, in response to the movement of the second electronic device.

According to various embodiments of the present disclosure, a method of operating a first electronic device includes receiving first data indicating a second electronic device registered to the first electronic device from the second electronic device, and displaying second data corresponding to the first data in a first area of a touch screen, corresponding to a movement of the second electronic device with respect to the touch screen, in response to the movement of the second electronic device.

According to various embodiments of the present disclosure, an electronic device displays information related to an external electronic device in an area corresponding to a movement of the external electronic device with respect to a touch screen included in the electronic device in response to the movement of the external electronic device. Therefore, a user may check information without any additional procedure.

BRIEF DESCRIPTION OF DRAWINGS

The above and other aspects, features and advantages of the present disclosure will be more apparent from the following detailed description taken in conjunction with the accompanying drawings, in which.

MODE FOR CARRYING OUT THE INVENTION

Figure 1:
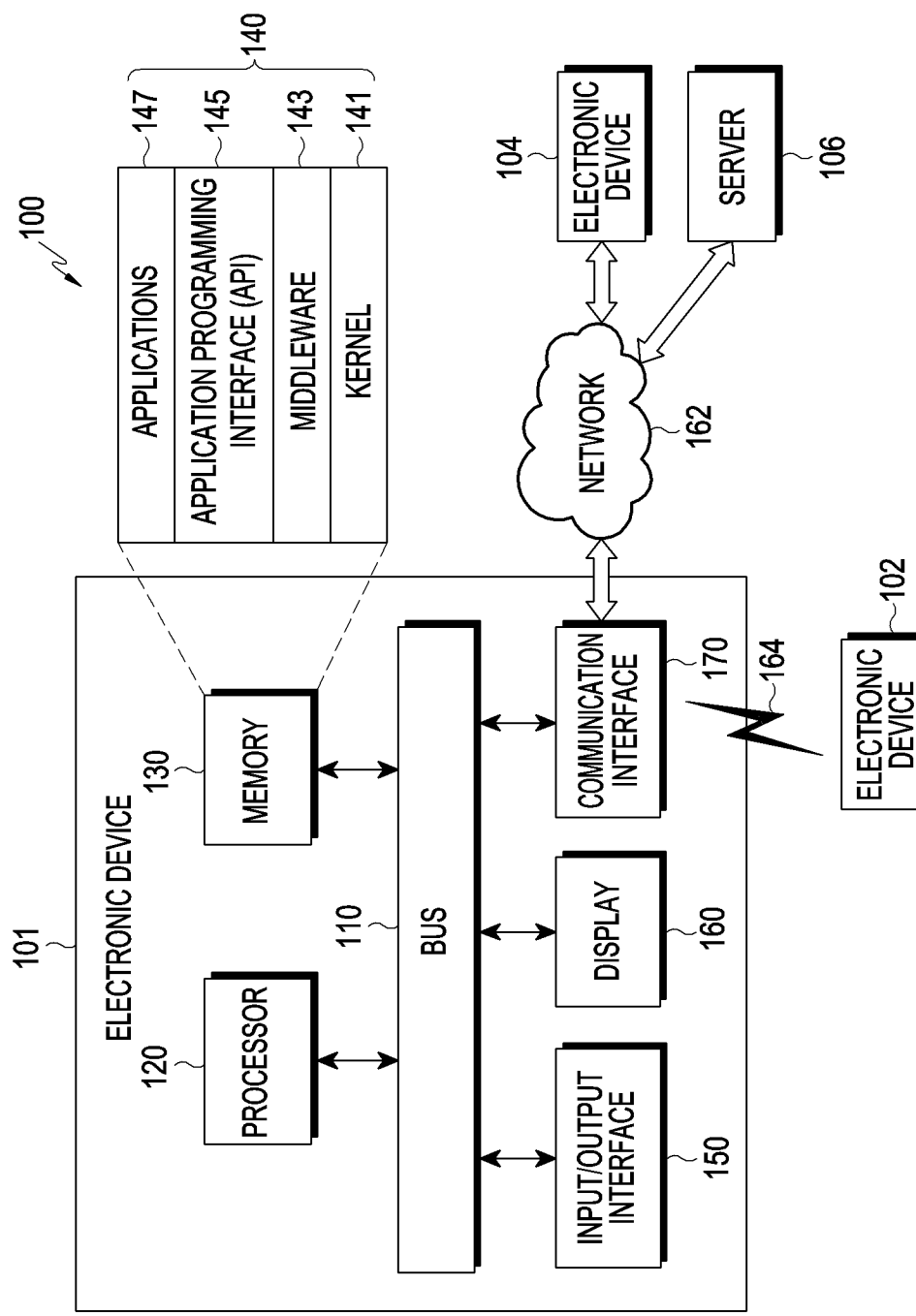
FIG. 1 is a block diagram illustrating an electronic device according to various embodiments of the present disclosure.

Various embodiments of the present disclosure are described with reference to the accompanying drawings. However, the embodiments and terms used herein are not intended to limit the technical scope of the disclosure, and it is to be understood that the present disclosure covers various modifications, equivalents, and/or alternatives. With regard to the description of the drawings, similar reference numerals may be used to refer to similar elements. It is to be understood that singular forms include plural referents unless the context clearly dictates otherwise. As used herein, each of such phrases as "A or B" or "at least one of A and/or B" may include all possible combinations of the items enumerated together in a corresponding one of the phrases. The term as used in the present disclosure. "1$^{st}$", "second", "first" or "second' may be used for the names of various components irrespective of sequence or importance. These expressions are used to distinguish one component from another component, not limiting the components. When it is said that a component (e.g., a first component) is "(operatively or communicatively) coupled with/to" or "connected to" another component (e.g., a second component), it should be understood that the one component is connected to the other component directly or through any other component (e.g., a third component).

The term "configured to" as used herein may be interchangeably used with, for example, the term "suitable for", "having the capacity to", "adapted to", "made to", "capable of", or "designed to" in hardware or software under circumstances. Under some circumstances, the term "a device configured to" may mean that the device may be "capable of" with another device or part. For example, "a processor designed (or configured) to execute A, B, and C" may mean a dedicated processor (e.g., an embedded processor) for performing the corresponding operations or a generic-purpose processor (e.g., a central processing unit (CPU) or an application processor) for performing the operations by executing one or more software programs stored in a memory device.

An electronic device according to various embodiments of the disclosure may include at least one of, for example, a smartphone, a tablet personal computer (PC), a mobile phone, a video phone, an e-book reader, a desktop PC, a laptop PC, a netbook computer, a workstation, a server, a personal digital assistant (PDA), a portable multimedia player (PMP), an MP3 player, medical equipment, a camera, or a wearable device. The wearable device may include at least one of an accessory type (e.g., a watch, a ring, a bracelet, an ankle bracelet, a necklace, glasses, contact lenses, or a head-mounted device (HMD)), a fabric or clothes type (e.g., electronic clothes), a body-attached type (e.g., a skin pad or tattoo), or an implantable circuit.

According to some embodiments, an electronic device may include at least one of, for example, a television, a digital versatile disk (DVD) player, an audio player, a refrigerator, an air conditioner, a vacuum cleaner, an oven, a microwave oven, a washer, an air purifier, a set-top box, a home automation control panel, a security control panel, a media box (e.g., Samsung HomeSync™ Apple TV™, or Google TV™), a game console (e.g., Xbox™ or PlayStation™) an electronic dictionary, an electronic key, a camcorder, or an electronic picture frame. According to other embodiments, an electronic device may include at least one of a medical device (e.g., a portable medical meter (a blood glucose meter, a heart rate meter, a blood pressure meter, a body temperature meter, or the like), a magnetic resonance angiography (MRA) device, a magnetic resonance imaging (MRI) device, a computed tomography (CT) device, an imaging device, an ultrasonic device, or the like), a navigation device, a global navigation satellite system (GNSS), an event data recorder (EDR), a flight data recorder (FDR), an automotive infotainment device, a naval electronic device (e.g., a naval navigation device, a gyrocompass, or the like), an avionic electronic device, a security device, an in-vehicle head unit, an industrial or consumer robot, an automatic teller's machine (ATM) in a financial facility, a point of sales (POS) device in a shop, or an Internet of things device (e.g., a lighting bulb, various sensors, a sprinkler, a fire alarm, a thermostat, a street lamp, a toaster, sporting goods, a hot water tank, a heater, a boiler, or the like). According to some embodiments, an electronic device may include at least one of furniture, part of a building/structure or a vehicle, an electronic board, an electronic signature receiving device, a projector, or various measuring devices (e.g., a water, electricity, gas or electromagnetic wave measuring device). According to various embodiments, an electronic device may be flexible or one or a combination of two or more of the foregoing devices. An electronic device according to an embodiment of the disclosure may not be limited to the foregoing devices. In the disclosure, the term user may refer to a person or device (e.g., artificial intelligence electronic device) that uses an electronic device.

Referring to FIG. 1, an electronic device 101 in a network environment 100 according to various embodiments is described. The electronic device 101 may include a bus 110, a processor 120, a memory 130, an input/output (I/O) interface 150, a display 160, and a communication interface 170. In some embodiments, at least one of the components may be omitted in the electronic device 101 or a component may be added to the electronic device 101. The bus 110 may interconnect the foregoing components 110 to 170, and include a circuit which allows communication (e.g., transmission of control messages or data) between the foregoing components. The processor 120 may include one or more of a CPU, an application processor (AP), or a communication processor (CP). The processor 120 may, for example, execute computation or data processing related to control and/or communication of at least one other component of the electronic device 101.

The memory 130 may include a volatile memory and/or a non-volatile memory. The memory 130 may, for example, store instructions or data related to at least one other component of the electronic device 101. According to an embodiment, the memory 130 may store software and/or a program 140. The program 140 may include, for example, a kernel 141, middleware 143, an application programming interface (API) 145, and/or an application program (or "application") 147. At least a part of the kernel 141, the middleware 143, or the API 145 may be called an operating system (OS). The kernel 141 may control or manage system resources (e.g., the bus 110, the processor 120, or the memory 130) that are used in executing operations or functions implemented in other programs (e.g., the middleware 143, the API 145, or the application programs 147). Also, the kernel 141 may provide an interface for allowing the middleware 143, the API 145, or the application programs 147 to access individual components of the electronic device 101 and control or manage system resources.

The middleware 143 may serve as a medium through which the kernel 141 may communicate with, for example, the API 145 or the application programs 147 to transmit and receive data. Also, the middleware 143 may process one or more task requests received from the application programs 147 according to priority levels. For example, the middleware 143 may assign priority levels for using system resources (e.g., the bus 110, the processor 120, or the memory 130) of the electronic device 101 to at least one of the application programs 147, and process the one or more task requests according to the priority levels. The API 145 is an interface through which the application programs 147 control functions provided by the kernel 141 or the middleware 143. For example, the API 145 may include at least one interface or function (e.g., a command) for file control, window control, video processing, or text control. The I/O interface 150 may output a command or data received from the user or an external device to the other component(s) of the electronic device 101. Further, the I/O interface 150 may output a command or data received from the other component(s) of the electronic device 101 to the user or the external device.

The display 160 may include, for example, a liquid crystal display (LCD), a light emitting diode (LED) display, an organic LED (OLED) display, a microelectromechanical systems (MEMS) display, or an electronic paper display. The display 160 may display, for example, various types of content (e.g., text, an image, a video, an icon, and/or a symbol) to the user. The display 160 may include a touch screen and receive, for example, a touch input, a gesture input, a proximity input, or a hovering input through an electronic pen or a user's body part. The communication interface 170 may establish communication, for example, between the electronic device 101 and an external device (e.g., a first external electronic device 102, a second external electronic device 104, or a server 106). For example, the communication interface 170 may be connected to a network 162 by wireless communication or wired communication and communicate with the external device (e.g., the second external electronic device 104 or the server 106) over the network 162.

The wireless communication may include cellular communication using, for example, at least one of long-term evolution (LTE), LTE-Advanced (LTE-A), code division multiple access (CDMA), wideband CDMA (WCDMA), universal mobile telecommunication system (UMTS), Wireless Broadband (WiBro), or global system for mobile communications (GSM). According to an embodiment, the wireless communication may include, for example, at least one of, for example, wireless fidelity (WiFi), Bluetooth, Bluetooth low energy (BLE), Zigbee, near field communication (NFC), magnetic secure transmission (MST), radio frequency (RF), or body area network (BAN). According to an embodiment, the wireless communication may include global navigation satellite system (GNSS). GNSS may be, for example, global positioning system (GPS), global navigation satellite system (Glonass), Beidou navigation satellite system (hereinafter, referred to as "Beidou"), or Galileo, the European global satellite-based navigation system. In the disclosure, the terms "GPS" and "GNSS" are interchangeably used with each other. The wired communication may include, for example, at least one of universal serial bus (USB), high definition multimedia interface (HDMI), recommended standard 232 (RS-232), power line communication, or plain old telephone service (POTS). The network 162 may be a telecommunication network, for example, at least one of a computer network (e.g., LAN or WAN), the Internet, or a telephone network.

Each of the first and second external electronic devices 102 and 104 may be of the same type as or a different type from the electronic device 101. According to various embodiments, all or a part of operations performed in the electronic device 101 may be performed in one or more other electronic devices (e.g., the electronic devices 102 and 104) or the server 106. According to an embodiment, if the electronic device 101 is to perform a function or a service automatically or upon request, the electronic device 101 may request at least a part of functions related to the function or the service to another device (e.g., the electronic device 102 or 104 or the server 106), instead of performing the function or the service autonomously, or additionally. The other electronic device (e.g., the electronic device 102 or 104 or the server 106) may execute the requested function or an additional function, and provide a result of the function execution to the electronic device 101. The electronic device 101 may provide the requested function or service based on the received result or by additionally processing the received result. For this purpose, for example, cloud computing, distributed computing, or client-server computing may be used.

Figure 2:
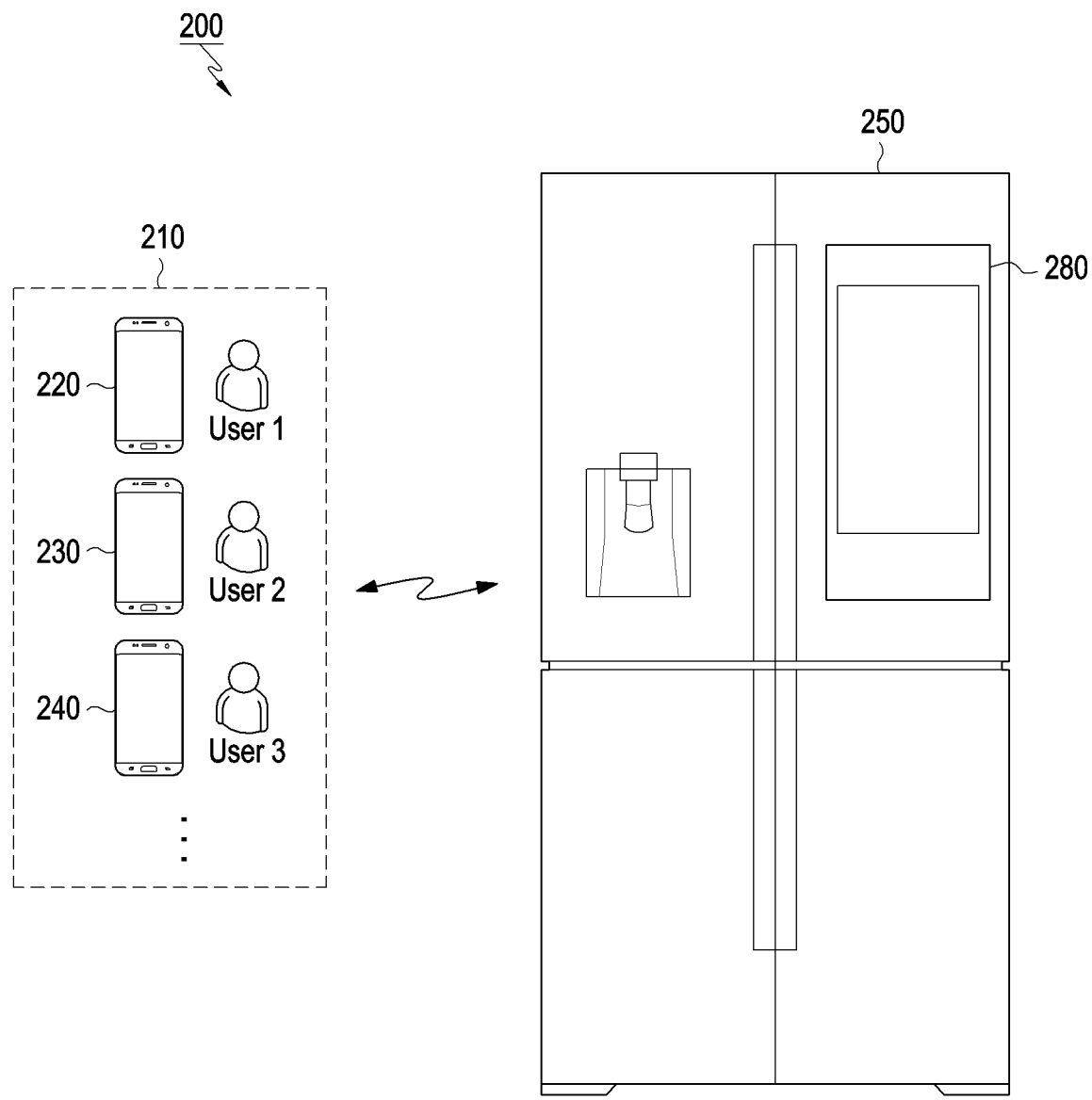
FIG. 2 is a block diagram illustrating an electronic system according to various embodiments of the present disclosure.

FIG. 2 is a block diagram illustrating an electronic system according to various embodiments of the present disclosure.

Referring to FIG. 2, an electronic system 200 may include a plurality of first electronic devices 210 and a second electronic device 250.

The electronic system 200 may be implemented substantially in the same manner as or a similar manner to the network environment 100 described with reference to FIG. 1. For example, at least one of the first electronic devices 210 in the electronic system 200 may be connected to the second electronic device 250 through a wireless communication technology or a wired communication technology.

The first electronic devices 210 may include at least one first electronic device 220, 230, or 240.

The first electronic devices 210 may communicate with the second electronic device 250. For example, the first electronic devices 210 may be registered to the second electronic device 250. Further, the first electronic devices 210 may provide information related to the first electronic devices 210 through the second electronic device 250.

One (hereinafter, the first electronic device 220) of the first electronic devices 210 may transmit first data to the second electronic device 250. For example, when the first electronic device 220 is close to the second electronic device 250 (e.g., within a predetermined distance), the first electronic device 220 may transmit the first data to the second electronic device 250 by the wireless communication technology. The first data may be data used to determine whether the first electronic device 220 has been registered to the second electronic device 250. For example, the first data may refer to data representing the first electronic device 220 (or data identifying the first electronic device 220).

Further, the first electronic device 220 may transmit second data to the second electronic device 250 by a wireless communication technology. The second data may be data related to the first electronic device 220.

According to an embodiment of the present disclosure, the first electronic device 220 may make a movement MI with respect to a touch screen 280 of the second electronic device 250 to display the second data related to the first electronic device 220 on the second electronic device 250. For example, the movement MI of the first electronic device 220 may include a hovering input and/or a touch input (or touch drag) to the touch screen 280 of the second electronic device 250.

For example, each of the first electronic devices 210 may be implemented as a smart phone, a tablet PC, and/or a terminal.

The second electronic device 250 may provide information related to the first electronic devices 210.

The second electronic device 250 may include the touch screen 280. For example, the second electronic device 250 may be implemented as an electronic device including the touch screen 280 (e.g., a large touch screen). For example, the second electronic device 250 may be implemented as a refrigerator, a smart mirror, a smart window, a TV, a tablet PC, and/or a smart picture frame including a touch screen.

According to an embodiment of the present disclosure, the second electronic device 250 may register each of the first electronic devices 210. For example, the second electronic device 250 may set some of a plurality of areas included in the touch screen 280 as areas for displaying information about the respective registered first electronic devices 210. An area for displaying information of each registered first electronic device 210 may be set by a user or automatically.

According to an embodiment of the present disclosure, the second electronic device 250 may determine whether the first electronic device 220 has been registered to the second electronic device 250. If the first electronic device 220 has been registered to the second electronic device 250, the second electronic device 250 may display the second data related to the first electronic device 220 on the touch screen 280. For example, when a movement of the first electronic device 220 is made with respect to the touch screen 280, the second data is displayed on an area of the touch screen 280 corresponding to the movement MI of the first electronic device 220.

Figure 3:
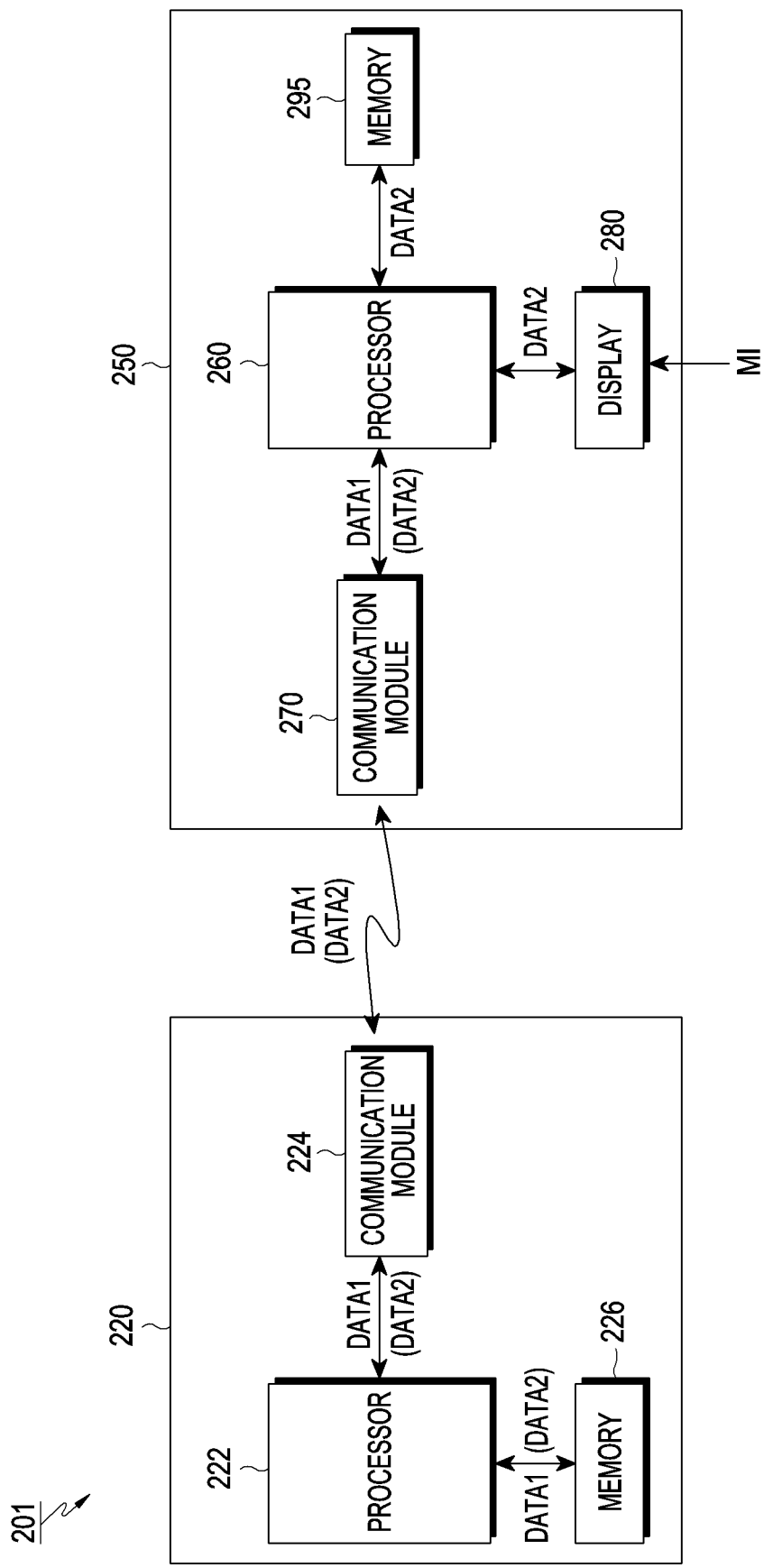
FIG. 3 is a detailed block diagram illustrating an electronic system according to various embodiments of the present disclosure.

FIG. 3 is a detailed block diagram illustrating an electronic system according to various embodiments of the present disclosure.

Referring to FIG. 3, an electronic system 201 may include the first electronic device 220 and the second electronic device 250. For example, the electronic system 201 may be implemented to be substantially the same as or similar to the electronic system 200 described with reference to FIG. 2.

The first electronic device 220 may include a processor 222, a communication module 224, and a memory 226.

The processor 222 may provide overall control to operations of the first electronic device 220.

According to an embodiment of the present disclosure, the processor 222 may transmit first data DATA1 identifying the first electronic device 220 to the second electronic device 250 through the communication module 224 to display information on the touch screen 280 of the second electronic device 250.

The processor 222 may transmit second data DATA2 corresponding to the first data DATA1 to the second electronic device 250 so that the second electronic device 150 may display the second data DATA2 in a first area of the touch screen 280 of the second electronic device 250 corresponding to the movement MI of the first electronic device 220.

The first data DATA1 may indicate the first electronic device 220 and may be information or data identifying the first electronic device 220.

For example, the processor 222 may transmit the first data DATA1 to the second electronic device 250 to register to the second electronic device 250. Further, the processor 222 may transmit the first data DATA1 to the second electronic device 250 in order to display the second data DATA2 corresponding to the first data DATA1 on the second electronic device 250.

The second data DATA2 may be information or data related to the first electronic device 220, displayed on the touch screen 280 of the second electronic device 250. For example, the second data DATA2 may be information (e.g., a schedule, a plan, and/or a memo) for the user of the first electronic device 220.

The second data DATA2 may be stored in the first electronic device 220 or the second electronic device 250.

The communication module 224 may execute a communication function with the second electronic device 250. For example, the communication module 224 may transmit and receive data to and from the second electronic device 250 using a wireless communication technology or a wired communication technology.

The memory 226 may store data for communicating with the second electronic device 250. The memory 226 may be implemented as a non-volatile memory. For example, the memory 226 may store the first data DATA1 and the second data DATA2.

The second electronic device 250 may include a processor 260, a communication module 270, a touch screen 280, and a memory 295.

The processor 260 may provide overall control to operations of the second electronic device 250.

According to an embodiment of the present disclosure, the processor 260 may receive the first data DATA1 indicating the second electronic device 250 from the first electronic device 220 registered to the second electronic device 250 through the communication module 270.

The processor 260 may determine whether the first electronic device 220 has been registered to the second electronic device 250 based on the first data DATA1.

The processor 260 may detect a movement MI of the first electronic device 220 with respect to the touch screen 280. Further, the processor 260 may identify a position (e.g., a coordinate position) of the touch screen 280, at which the movement MI of the electronic device 220 has been detected based on the movement MI of the first electronic device 220.

For example, when the first electronic device 220 includes a conductor, the processor 260 may detect a touch input of the first electronic device 220 with respect to the touch screen 280. Further, when the first electronic device 220 includes a conductor, the processor 260 may detect a hovering input of the first electronic device 220 to the touch screen 280.

Meanwhile, when the touch screen 280 includes a photodiode, the processor 260 may detect the movement MI of the first electronic device 220 by using the photodiode included in the touch screen 280.

In response to the movement MI of the first electronic device 220 with respect to the touch screen 280, the processor 260 may display the second data DATA2 corresponding to the first data DATA1 in the first area of the touch screen 280 corresponding to the movement MI of the first electronic device 220.

The first area may be an area corresponding to the movement MI of the first electronic device 220 on the touch screen 280. For example, the first area may be an area corresponding to a position where the first electronic device 220 has moved on the touch screen 280.

The processor 260 may set a plurality of areas corresponding to the plurality of first electronic devices 210 on the touch screen 280. For example, the processor 260 may set a reference area for displaying the second data DATA2 related to the first electronic device 220 among the plurality of areas.

The processor 260 may compare the reference area with the first area corresponding to the movement MI of the first electronic device 220, and display the second data DATA2 in at least a part of the reference area according to the comparison result. For example, when the first area is included in the reference area, the processor 260 may display the second data DATA2 in the first area. On the other hand, when the first area is not included in the reference area, the processor 260 may not display the second data DATA2. Further, when a part of the first area is not included in the reference area, the processor 260 may display the second data DATA2 only in the first area included in the reference area.

According to an embodiment of the present disclosure, the processor 260 may determine whether the first electronic device 220 has been registered based on the first data DATA1, and activate the reference area of the touch screen 280 according to the determination result. That is, if the first electronic device 220 has been registered to the second electronic device 250, the processor 260 may activate the reference area of the touch screen 280.

According to an embodiment of the present disclosure, the processor 260 may receive a touch input for the touch screen 280 corresponding to the movement MI of the first electronic device 220. Further, the processor 260 may display the second data DATA2 in the first area corresponding to the touch input.

The processor 260 may acquire the second data DATA2 stored in the memory 295 in response to the first data DATA1 received from the first electronic device 220. Further, the processor 260 may receive the second data DATA2 from the first electronic device 220 through the communication module 270 by using the first data DATA1.

According to an embodiment of the present disclosure, the processor 260 may receive, from a third electronic device (e.g., an electronic device 230) other than the first electronic device 220, third data indicating the third electronic device 230 through the communication module 270. The processor 260 may determine whether the third electronic device 230 has been registered to the second electronic device 250 based on the third data.

When the third electronic device 230 has been registered to the second electronic device 250, the processor 260 may obtain fourth data corresponding to the third data. The fourth data may be data related to the third electronic device 230.

The processor 260 may detect a movement of the third electronic device 230 with respect to the touch screen 280. In response to the movement of the third electronic device 230, the processor 260 may display the fourth data corresponding to the third data in a second area of the touch screen 280 corresponding to the movement of the third electronic device 230. For example, when the second data DATA2 is displayed in the first area, the processor 260 may delete the second data DATA2 displayed in the first area and display the fourth data in the second area.

The second area may be an area corresponding to the movement of the third electronic device 230 on the touch screen 280. For example, the second area may be an area corresponding to a position where the third electronic device 230 has moved on the touch screen 280.

The communication module 270 may communicate with the first electronic device 220. For example, the communication module 270 may receive the first data DATA1 from the first electronic device 220 using a wireless communication technology or a wired communication technology. Further, the communication module 270 may receive the second data DATA2 using the wireless communication technology or the wired communication technology.

The touch screen 280 may receive a touch input or a hovering input. Further, the touch screen 280 may identify the coordinates of the touch panel in which the touch input or the hovering input has been detected.

For example, the touch screen 280 may include a touch panel. For example, the touch panel may be implemented as a capacitive touch panel and/or a resistive touch panel. Further, the touch screen 280 may include a pressure sensor and/or an image sensor.

When the touch panel is implemented as a capacitive touch panel, the touch screen 280 may detect a touch input or a hovering input to a conductor included in the first electronic device 220.

Further, when the touch panel is implemented as a resistive touch panel or the touch screen 280 includes a pressure sensor, the touch screen 280 may sense a touch input of the first electronic device 220 to the touch screen 280. When the touch screen 280 includes an image sensor, the touch screen 280 may detect a movement of the first electronic device 220 with respect to the touch screen 280.

The memory 295 may store data related to the operation of the second electronic device 250. For example, the memory 295 may store registration information (e.g., data related to the first data DATA1) of the first electronic devices 210. Further, the memory 295 may store the second data DATA2. In this case, the memory 295 may be implemented as a non-volatile memory.

Figure 4:
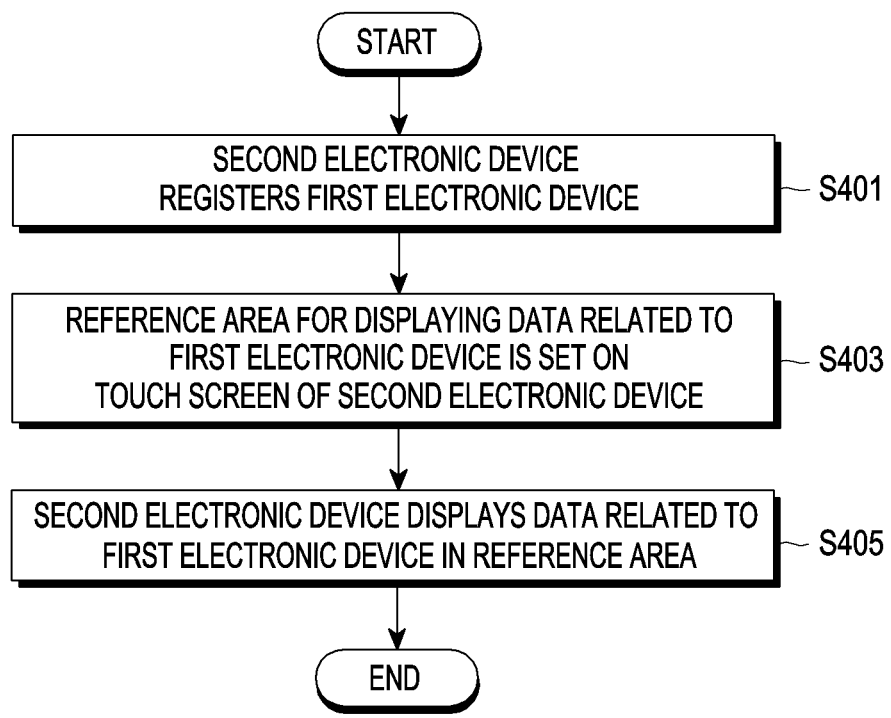
FIG. 4 is a flowchart illustrating an operation of a first electronic device according to various embodiments of the present disclosure.

FIG. 4 is a flowchart illustrating an operation of an electronic system according to various embodiments of the present disclosure.

Referring to FIG. 4, the second electronic device 250 may register a plurality of first electronic devices 210. For example, the second electronic device 250 may register one (e.g., the first electronic device 220) of the plurality of first electronic devices 210 (S401).

The second electronic device 250 may set a plurality of areas corresponding to the plurality of first electronic devices 210 on the touch screen 280. For example, the second electronic device 250 may set a reference area for displaying the second data DATA2 related to the first electronic device 220 on the touch screen 280 (S403). For example, the reference area may be an area set to display only the second data DATA2 related to the first electronic device 210 among the plurality of first electronic devices 210.

The second electronic device 250 may display second data related to the first electronic device 220 in the set reference area (S405).

The second electronic device 250 may set a common area for displaying data related to the plurality of first electronic devices 210 on the touch screen 280. For example, the common area may be an area set to display data related to any of the plurality of first electronic devices 210.

Figure 5:
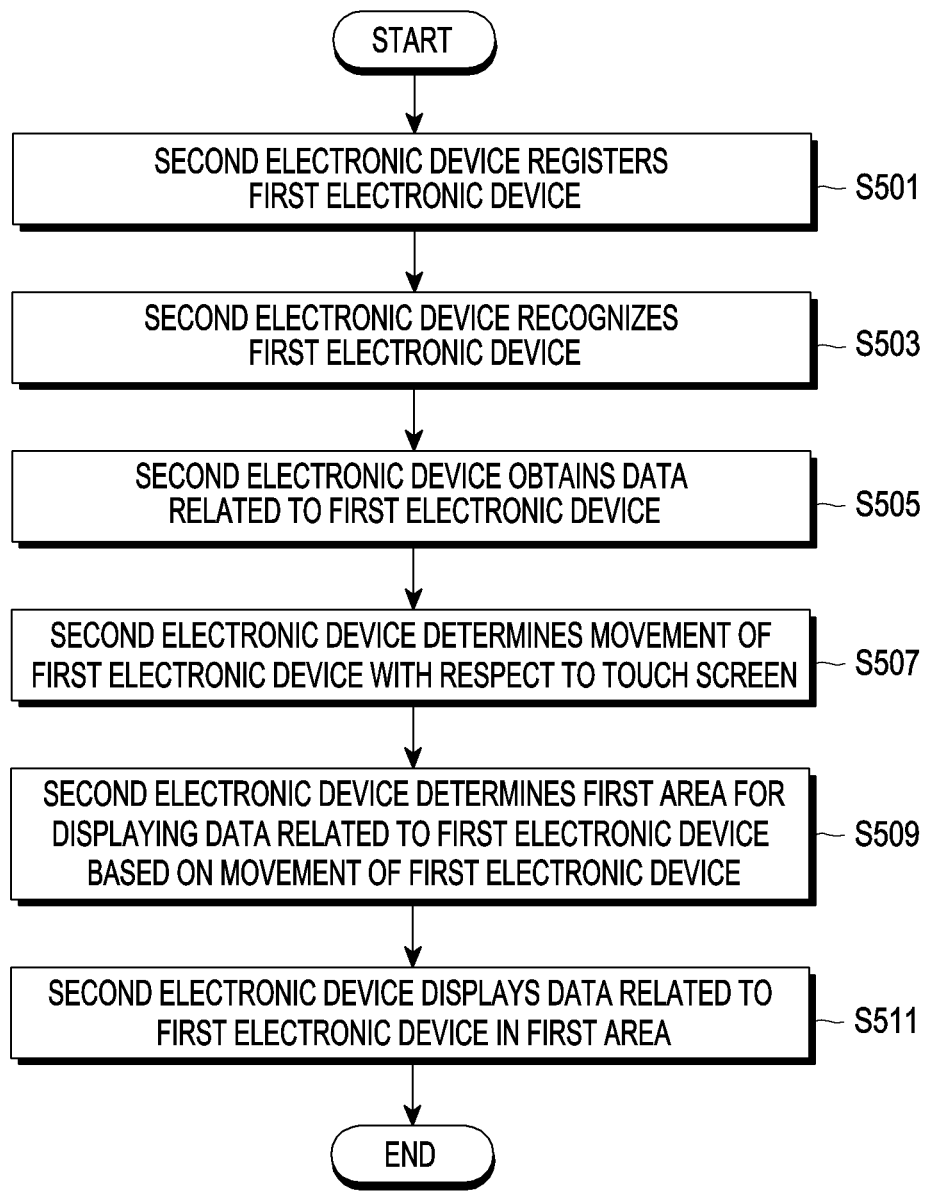
FIG. 5 is a flowchart illustrating an operation of a first electronic device according to various embodiments of the present disclosure.

FIG. 5 is a flowchart illustrating an operation of an electronic system according to various embodiments of the present disclosure.

Referring to FIG. 5, the second electronic device 250 may register a plurality of first electronic devices 210. For example, the second electronic device 250 may register one (e.g., the first electronic device 220) of the plurality of first electronic devices 210 (S501).

The second electronic device 250 may determine whether the first electronic device 220 has been registered and recognize the first electronic device 220 according to the determination result (S503). For example, when the first electronic device 210 approaches the second electronic device 250 (e.g., within a predetermined distance), the second electronic device 250 may receive the first data DATA1 from the first electronic device 220. The second electronic device 250 may recognize the first electronic device 220 based on the first data DATA1.

When the first electronic device 220 is recognized, the second electronic device 250 may obtain the second data DATA2 related to the first electronic device 220 (S505). For example, the second electronic device 250 may obtain the second data DATA2 from the memory 295. Further, the second electronic device 250 may obtain the second data DATA2 from the first electronic device 220.

The second electronic device 250 may determine a movement MI of the first electronic device 220 with respect to the touch screen 280 (S507). For example, the second electronic device 250 may identify a position (e.g., the coordinates of the position) of the touch screen 280 corresponding to the movement MI of the first electronic device 220.

The second electronic device 250 may determine a first area of the touch screen 280 to display the second data DATA2 related to the first electronic device 220 based on the movement MI of the first electronic device 220 (S509). For example, the second electronic device 250 may determine the first area based on the position of the touch screen 280 corresponding to the movement MI of the first electronic device 220. Further, the first area may be determined based on the size of the first electronic device.

The second electronic device 250 may display the second data DATA2 related to the first electronic device 220 in the first area (S511). For example, the second electronic device 250 may display the second data DATA2 based on a direction in which the first electronic device 220 has moved.

Figure 6:
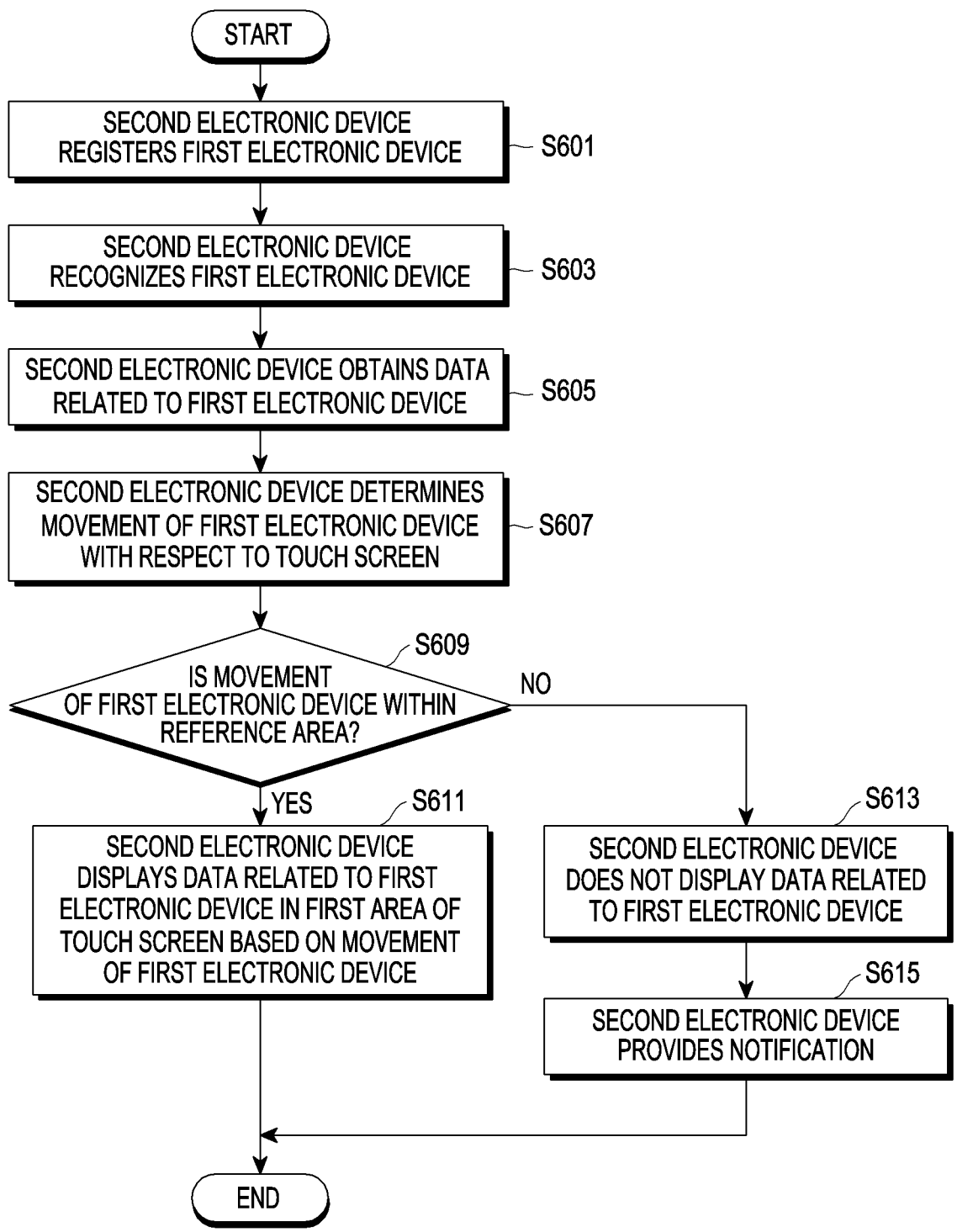
FIG. 6 is a flowchart illustrating an operation of a first electronic device according to various embodiments of the present disclosure.

FIG. 6 is a flowchart illustrating an operation of an electronic system according to various embodiments of the present disclosure.

Referring to FIG. 6, the second electronic device 250 may register a plurality of first electronic devices 210. For example, the second electronic device 250 may register one (e.g., the first electronic device 220) of the plurality of first electronic devices 210 (S601).

The second electronic device 250 may determine whether the first electronic device 220 has been registered, and recognize the first electronic device 220 according to the determination result (S603). For example, when the first electronic device 210 approaches the second electronic device 250 (e.g., within a predetermined distance), the second electronic device 250 may receive the first data DATA1 from the first electronic device 220 and recognize the first electronic device 220 based on the received first data DATA1.

When the first electronic device 220 is recognized, the second electronic device 250 may obtain the second data DATA2 related to the first electronic device 220 (S605). For example, the second electronic device 250 may obtain the second data DATA2 from the memory 295 or the first electronic device 220.

The second electronic device 250 may identify a movement MI of the first electronic device 220 with respect to the touch screen 280 (S607). For example, the second electronic device 250 may identify a position (e.g., the coordinates of the position) of the touch screen 280 corresponding to the movement MI of the first electronic device 220.

The second electronic device 250 may determine whether the movement MI of the first electronic device 220 has been made within the reference area (S609).

When the movement MI of the first electronic device 220 has been made within the reference area (YES in S609), the second electronic device 250 may display the second data DATA2 related to the first electronic device 220 in the first area of the touch screen 280 based on the movement MI of the first electronic device 220 (S611).

On the contrary, when the movement MI of the first electronic device 220 has not been made within the reference area (NO in S609), the second electronic device 250 may not display the second data DATA2 related to the first electronic device 220 (S613).

For example, the second electronic device 250 may provide a notification indicating that the movement MI of the first electronic device 220 has been made outside the reference area through the touch screen 280 (S615). Further, the second electronic device 250 may provide a notification indicating the position of the reference area on the touch screen 280.

When a part of the movement MI of the first electronic device 220 has been made in the reference area, the second electronic device 250 may display the second data DATA2 related to the first electronic device 220 in a part of the first area, included in the reference area based on the movement MI of the first electronic device 220.

Figure 7:
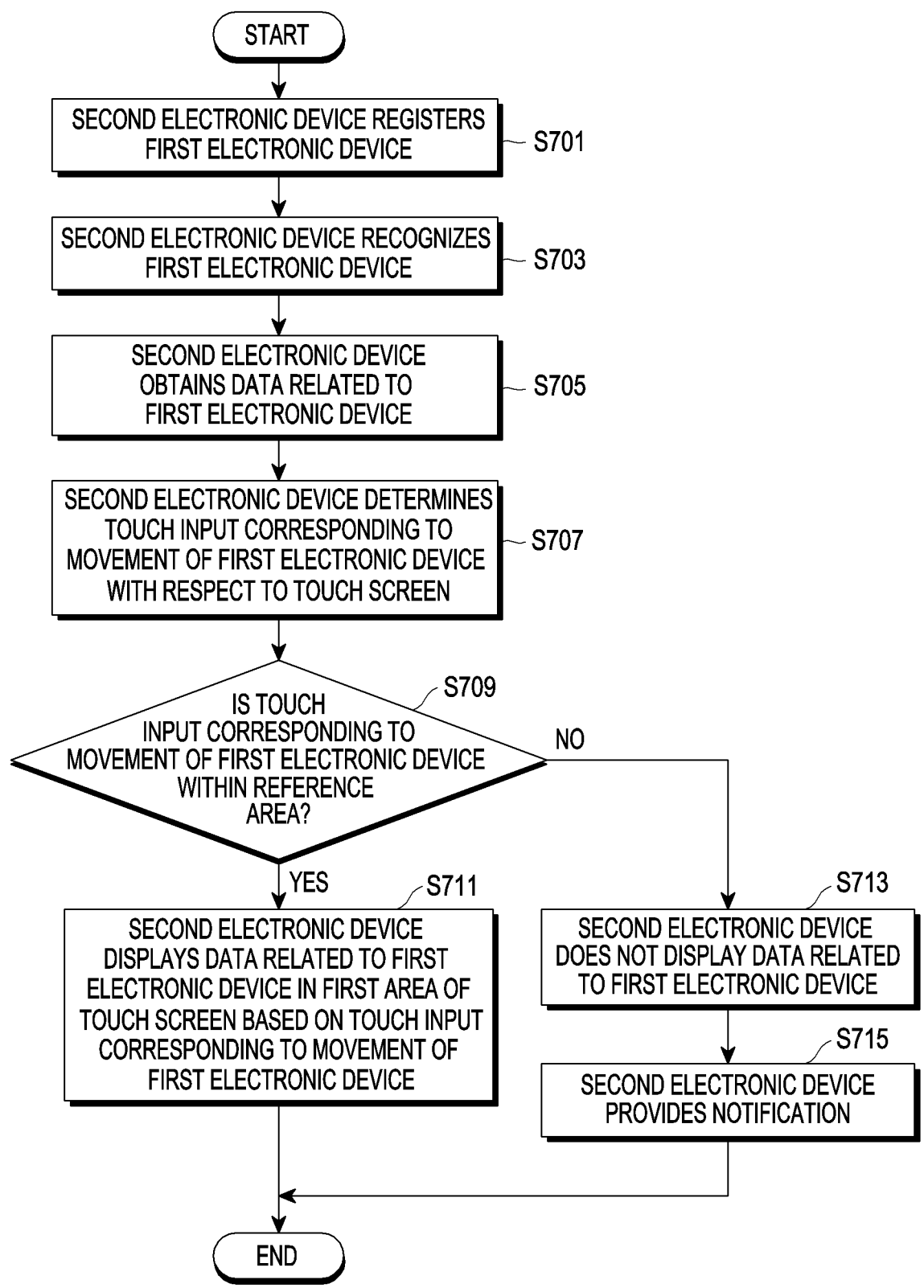
FIG. 7 is a flowchart illustrating an operation of a first electronic device according to various embodiments of the present disclosure.

FIG. 7 is a flowchart illustrating an operation of an electronic system according to various embodiments of the present disclosure.

Referring to FIG. 7, the second electronic device 250 may register a plurality of first electronic devices 210. For example, the second electronic device 250 may register one (e.g., the first electronic device 220) of the plurality of first electronic devices 210 (S701).

The second electronic device 250 may determine whether the first electronic device 220 has been registered and recognize the first electronic device 220 according to the determination result (S703). For example, when the first electronic device 210 approaches the second electronic device 250 (e.g., within a predetermined distance), the second electronic device 250 may receive the first data DATA1 from the first electronic device 220 and recognize the first electronic device 220 based on the received first data DATA1.

When the first electronic device 220 has been recognized, the second electronic device 250 may obtain the second data DATA2 related to the first electronic device 220 (S705). For example, the second electronic device 250 may obtain the second data DATA2 from the memory 295 or the first electronic device 220.

The second electronic device 250 may receive a touch input to the touch screen 280 corresponding to the movement MI of the first electronic device 220 (S707). Further, the second electronic device 250 may identify the position (e.g., coordinates on the touch screen 280) of the touch input corresponding to the movement MI of the first electronic device 220.

The second electronic device 250 may determine a first area of the touch screen 280 for displaying the second data DATA2 related to the first electronic device 220 based on the touch input corresponding to the movement MI of the first electronic device 220 (S709. For example, the second electronic device 250 may determine the first area based on the position of the touch input corresponding to the movement MI of the first electronic device 220. Further, the first area may be determined based on a touched area (e.g., the size of the touched area) of the touch screen 280 corresponding to the movement MI of the first electronic device 220.

The second electronic device 250 may determine whether the touch input corresponding to the movement MI of the first electronic device 220 has been generated in the reference area (S709).

When the touch input corresponding to the movement MI of the first electronic device 220 has been generated within the reference area (YES in S709), the second electronic device 250 may display the second data DATA2 related to the first electronic device 220 in the first area of the touch screen 280 based on the touch input (S711).

On the contrary, when the touch input corresponding to the movement MI of the first electronic device 220 has not been generated within the reference area (No in S709), the second electronic device 250 may not display the second data DATA2 related to the first electronic device 220 (S713).

For example, the second electronic device 250 may provide a notification indicating that the touch input corresponding to the movement MI of the first electronic device 220 has been received outside the reference area through the touch screen 280 (S715). Further, the second electronic device 250 may provide a notification indicating the position of the reference area on the touch screen 280.

When a part of the touch input corresponding to the movement MI of the first electronic device 220 has been generated in the reference area, the second electronic device 250 may display the second data DATA2 related to the first electronic device 220 in a part of the first area included in the reference area, based on the touch input.

Figure 8:
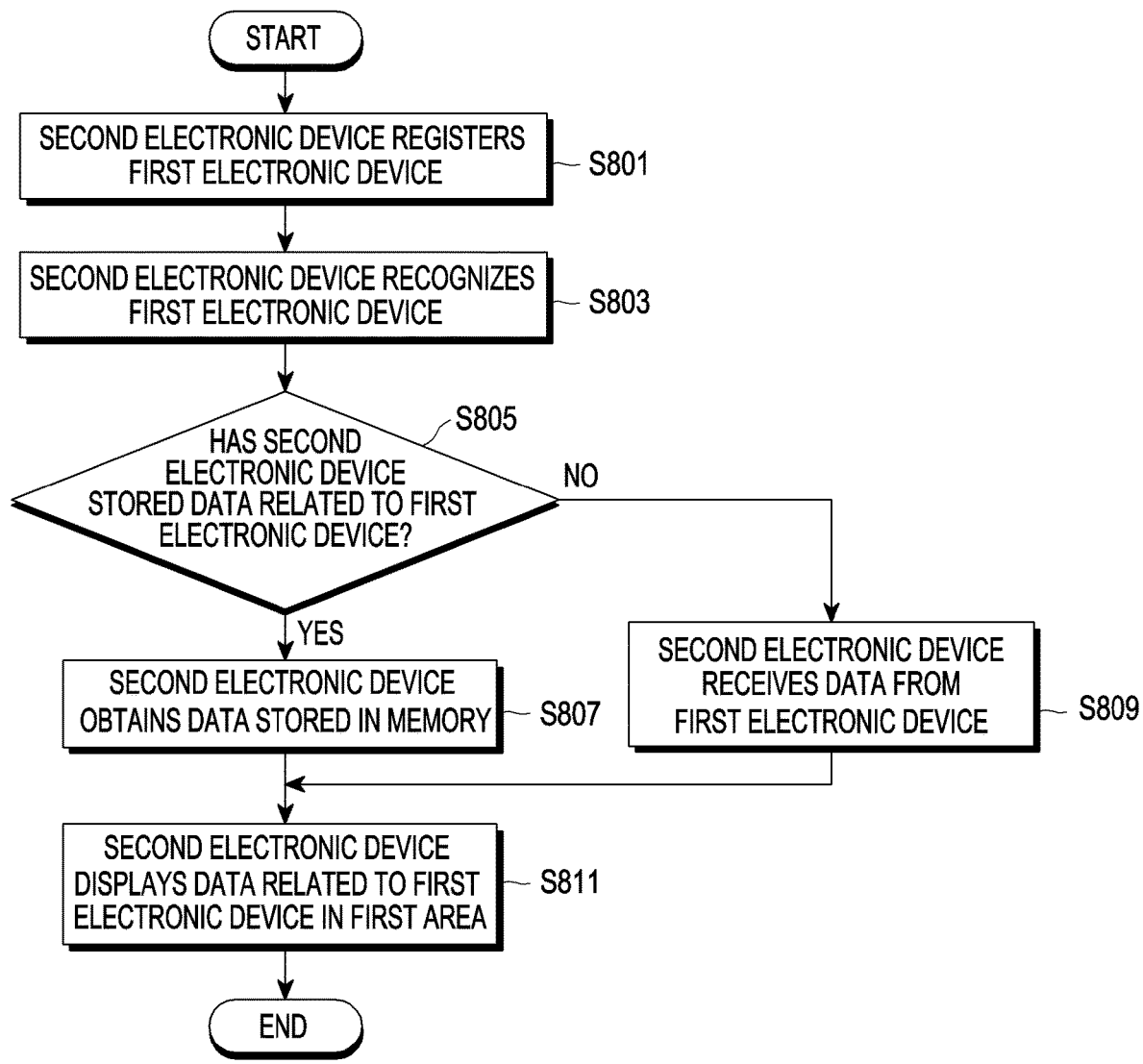
FIG. 8 is a flowchart illustrating an operation of a first electronic device according to various embodiments of the present disclosure.

FIG. 8 is a flowchart illustrating an operation of an electronic system according to various embodiments of the present disclosure.

Referring to FIG. 8, the second electronic device 250 may register a plurality of first electronic devices 210. For example, the second electronic device 250 may register one (e.g., the first electronic device 220) of the plurality of first electronic devices 210 (S801).

The second electronic device 250 may determine whether the first electronic device 220 has been registered, and recognize the first electronic device 220 according to the determination result (S803). For example, when the first electronic device 210 approaches the second electronic device 250 (e.g., within a predetermined distance), the second electronic device 250 may receive the first data DATA1 from the first electronic device 220 and recognize the first electronic device 220 based on the received the first data DATA1.

The second electronic device 250 may determine whether the second data DATA2 related to the first electronic device 220 is stored in the memory 295 (S805).

When the second data DATA2 is stored in the memory 295 (YES in S805), the second electronic device 250 may obtain the stored the second data DATA2 from the memory 295 (S807).

When the second data DATA2 is not stored in the memory 295 (NO in S805), the second electronic device 250 may receive the second data DATA2 from the first electronic device 220 (S809).

The second electronic device 250 may display the obtained the second data DATA2 related to the first electronic device 220 in a first area of the touch screen 280 (S811).

Even when the second data DATA2 is stored in the memory 295, the second electronic device 250 may obtain the second data DATA2 from the first electronic device 220. For example, in the case where the second data DATA2 received from the first electronic device 220 is configured to be displayed with priority, even when the second electronic device 250 stores the second data DATA2 in the memory 295, the second electronic device 250 may obtain the second data DATA2 from the first electronic device 220. Further, the second electronic device 250 may display the second data DATA2 received from the first electronic device 220 on the touch screen 280.

Figure 9:
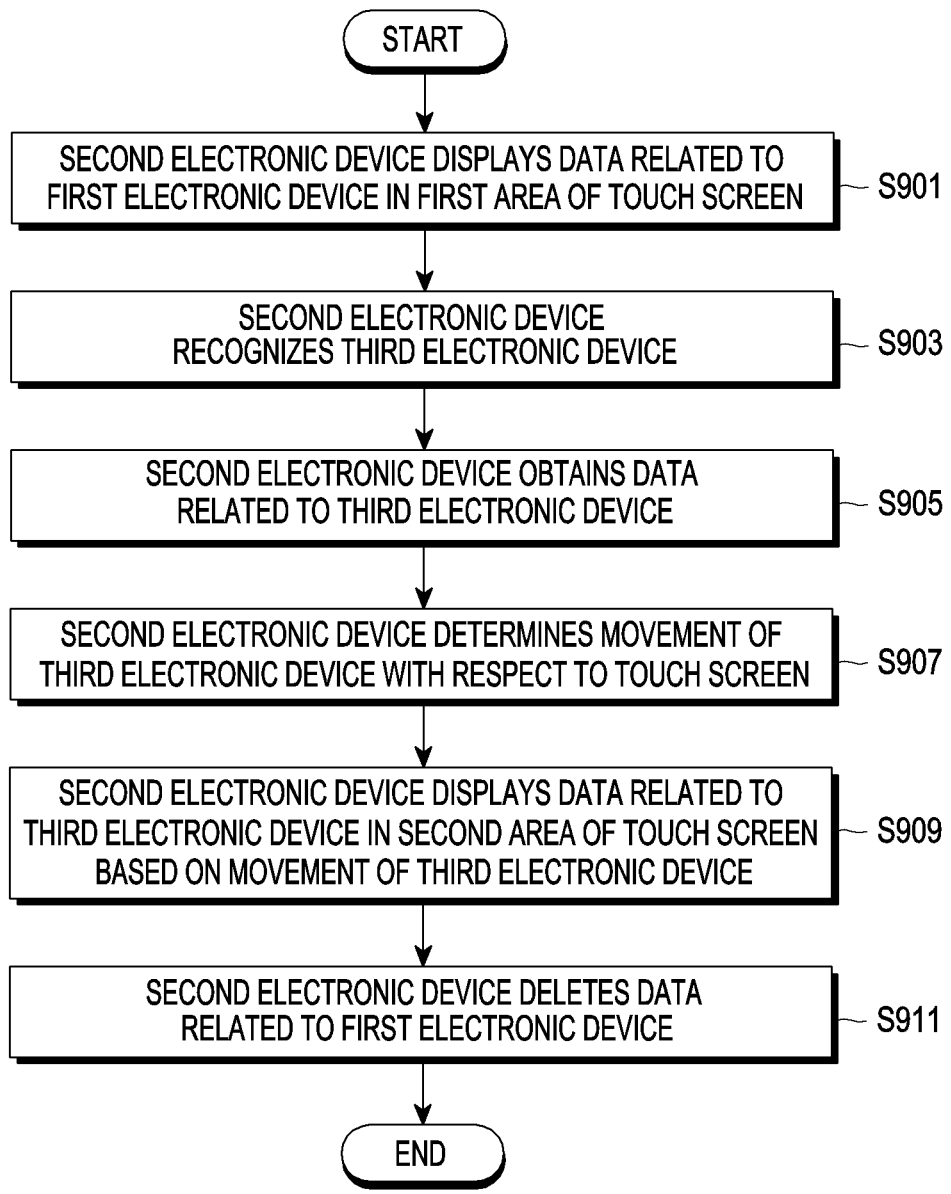
FIG. 9 is a flowchart illustrating an operation of a first electronic device according to various embodiments of the present disclosure.

FIG. 9 is a flowchart illustrating an operation of an electronic system according to various embodiments of the present disclosure.

Referring to FIG. 9, the second electronic device 250 may register a plurality of first electronic devices 210. For example, the second electronic device 250 may register the first electronic device 220 among the plurality of first electronic devices 210 and also the third electronic device 230 other than the first electronic device 220.

The second electronic device 250 may display the second data DATA2 related to the first electronic device 220 in a first area of the touch screen 280 (S901).

When the third electronic device 230 is close to the second electronic device 250, the second electronic device 250 may determine whether the third electronic device 230 has been registered and recognize the third electronic device according to the determination result (S903). For example, when the third electronic device 230 approaches the second electronic device 250 (e.g., within a predetermined distance), the second electronic device 250 may receive the third data from the third electronic device 230. The second electronic device 250 may recognize the third electronic device 230 based on the third data.

When the third electronic device 230 has been recognized, the second electronic device 250 may obtain the fourth data related to the third electronic device 230 (S905). For example, the second electronic device 250 may obtain the fourth data from the memory 295 or the third electronic device 230.

The second electronic device 250 may determine a movement of the third electronic device 230 with respect to the touch screen 280 (S907). For example, the second electronic device 250 may identify a position (e.g., the coordinates of the position) of the touch screen 280 corresponding to the movement of the third electronic device 230.

The second electronic device 250 may determine a second area of the touch screen 280 to display the fourth data related to the third electronic device 230 based on the movement MI of the first electronic device 220. For example, the second electronic device 250 may determine the second area based on the position of the touch screen 280 corresponding to the movement MI of the first electronic device 220. In addition, the second area may be determined based on the size of the third electronic device 230.

For example, the second area may be an area corresponding to the movement of the third electronic device 230 on the touch screen 280. For example, the second area may be an area corresponding to a position where the third electronic device 230 has moved on the touch screen 280. Further, the second area may be identical to or different from the first area.

The second electronic device 250 may display the fourth data related to the third electronic device 220 in the second area (S909). For example, the second electronic device 250 may display the fourth data based on a direction in which the third electronic device 230 has moved.

The second electronic device 250 may delete the second data DATA2 related to the first electronic device 220 displayed in a first area of the touch screen 280 while displaying the fourth data in the second area (S911). The second electronic device 250 may not delete the second data DATA2 related to the first electronic device 220 displayed on the touch screen 280 while displaying the fourth data in the second area.

Figure 10A:
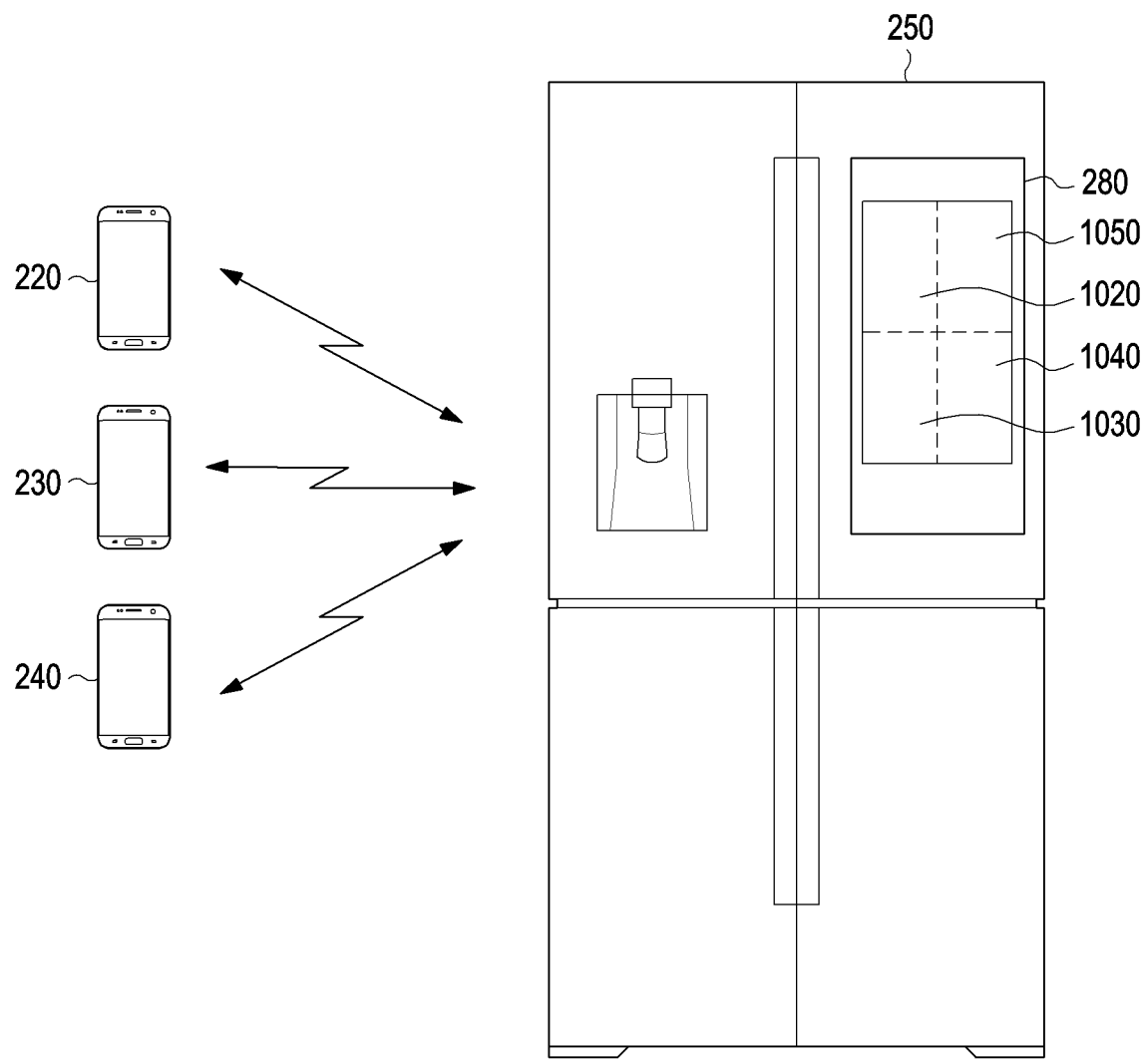
FIGS. 10a and 10b are block diagrams illustrating an operation of setting a plurality of areas in a first electronic device according to various embodiments of the present disclosure.
Figure 10B:
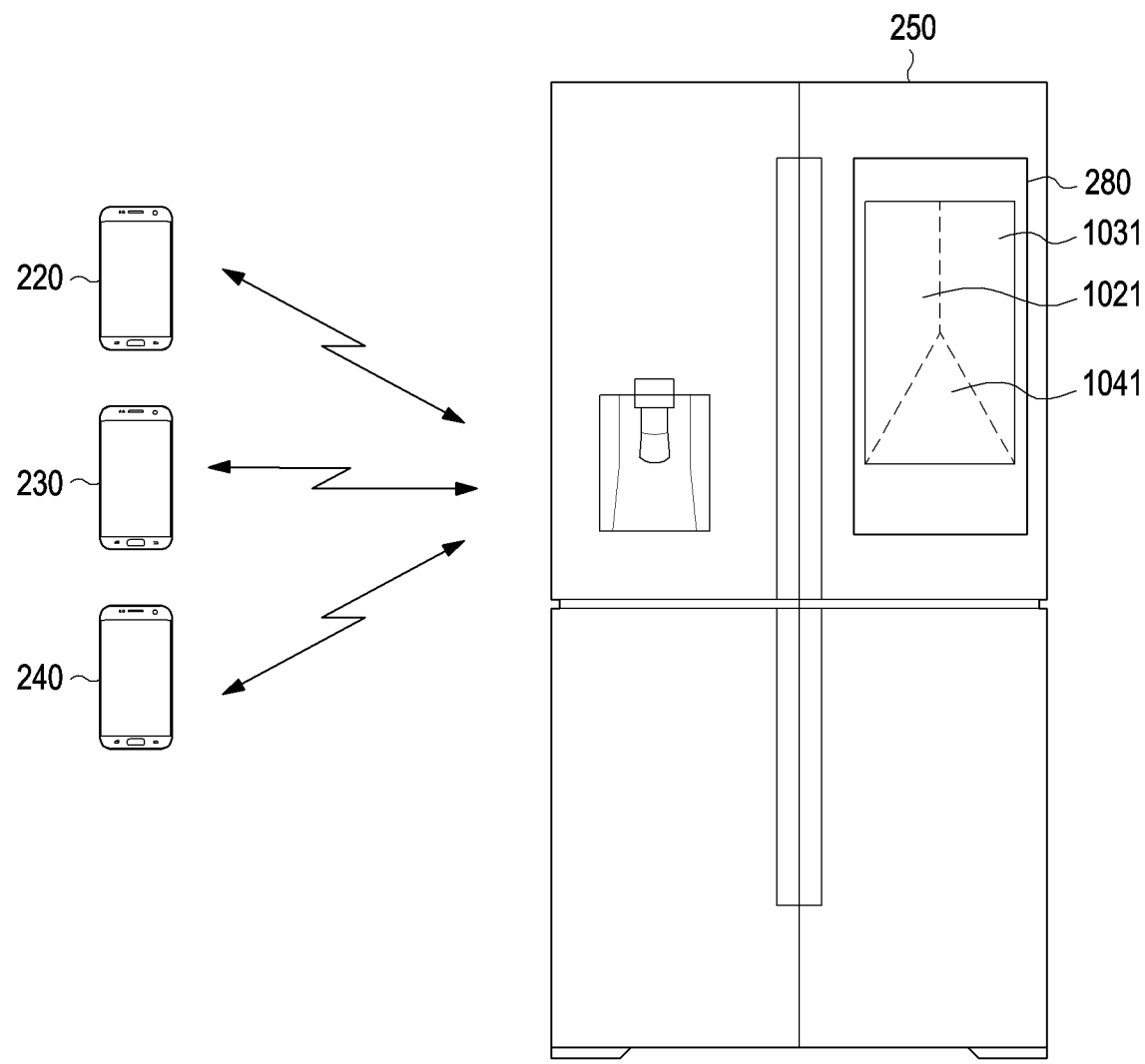

FIGS. 10a and 10b are block diagrams illustrating an operation of setting a plurality of areas by a first electronic device according to various embodiments of the present disclosure.

Referring to FIGS. 10a and 10b, the second electronic device 250 may register a plurality of first electronic devices 210. Further, the second electronic device 250 may set a plurality of areas corresponding to the plurality of first electronic devices 210 on the touch screen 280.

Referring to FIG. 10a, the second electronic device 250 may set a reference area for displaying data related to each of the first electronic device 220, the third electronic device 230, and a fourth electronic device 240.

For example, the second electronic device 250 may set a first reference area 1020 for the first electronic device 220, a second reference area 1030 for the third electronic device 230, and a third reference area 1040 for the fourth electronic device 340, on the touch screen 280. Further, the second electronic device 250 may set a common area 1050 of the first electronic device 220, the third electronic device 230, and the fourth electronic device 240 on the touch screen 280.

Referring to FIG. 10b, the second electronic device 250 may set a reference area for displaying data related to each of the first electronic device 220, the third electronic device 230, and the fourth electronic device 240, without setting a common area.

For example, the second electronic device 250 may set a first reference area 1021 for the first electronic device 220, a second reference area 1031 for the third electronic device 230, and a third reference area 1041 for the fourth electronic device 340, on the touch screen 280.

Although FIGS. 10a and 10a illustrate a predetermined number of plural reference areas which are set in predetermined shapes on the touch screen 280, for the convenience of description, the technical spirit of the present disclosure is not limited thereto. That is, the second electronic device 250 may set various numbers of reference areas in various shapes.

FIGS. 11a to 11e are block diagrams illustrating operations of a first electronic device according to various embodiments of the present disclosure.

According to an embodiment of the present disclosure, the second electronic device 250 may set a plurality of reference areas 1120, 1130, and 1140 respectively corresponding to the plurality of first electronic devices 220, 230, and 240. The second electronic device 250 may also set a common area 1150 for all of the first electronic devices 220, 230, and 240.

Figure 11A:
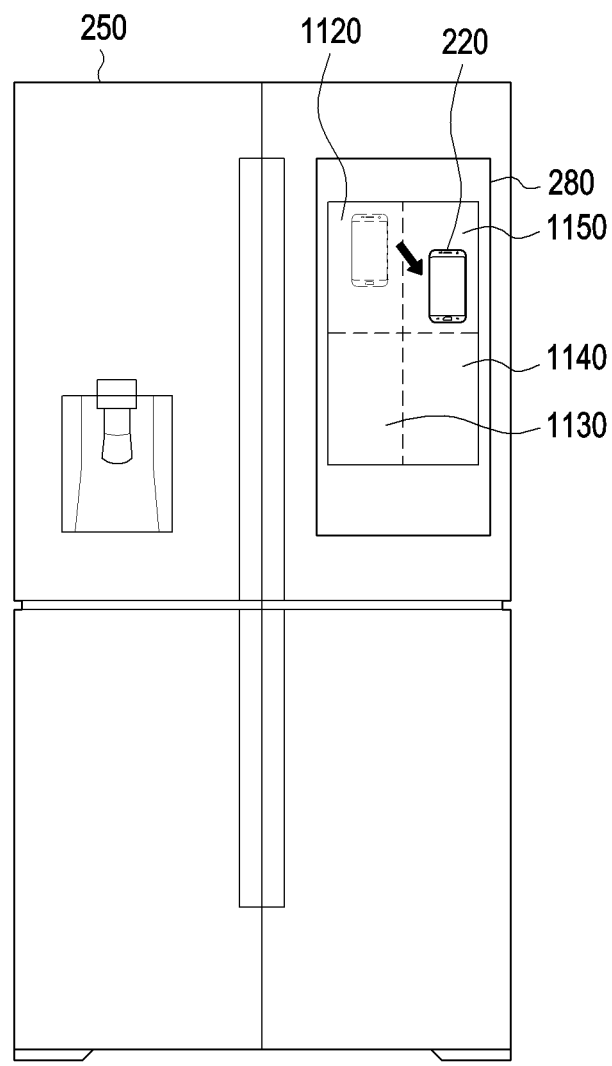
FIGS. 11a to 11e are block diagrams illustrating an operation of a first electronic device according to various embodiments of the present disclosure.

Referring to FIG. 11a, when the first electronic device 210 approaches the second electronic device 250 (e.g., within a predetermined distance), the second electronic device 250 may recognize the first electronic device 220 based on the first data DATA1 received from the first electronic device 220. Further, when the first electronic device 220 has been recognized, the second electronic device 250 may obtain the second data DATA2 related to the first electronic device 220.

The second electronic device 250 may determine a movement MI of the first electronic device 220 with respect to the touch screen 280. For example, the second electronic device 250 may detect a touch input corresponding to the movement MI of the first electronic device 220 on the touch screen 280.

Figure 11B:
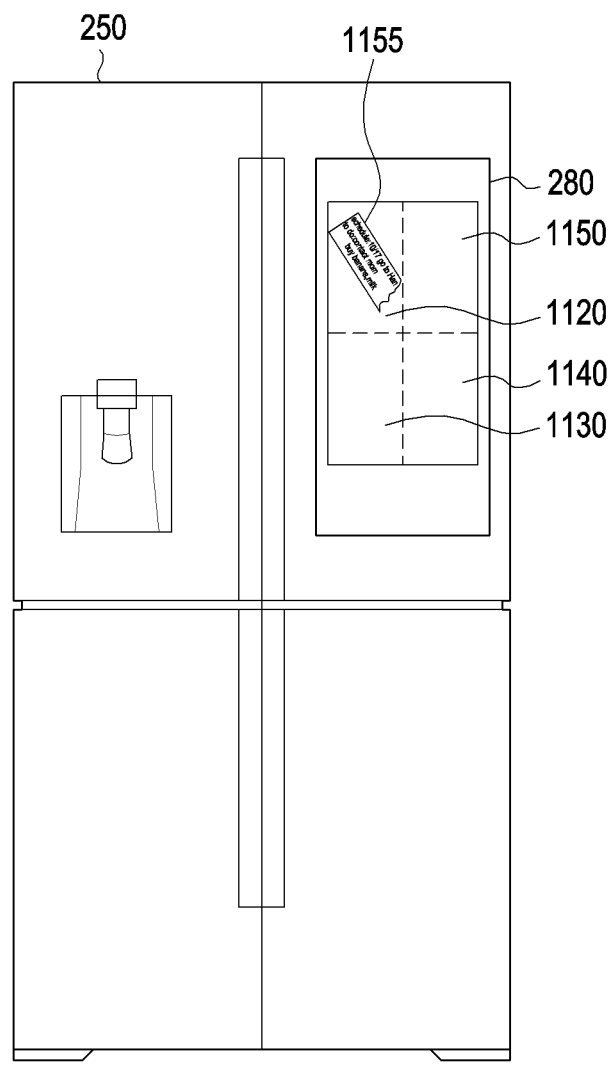

Referring to FIG. 11b, the second electronic device 250 may determine a first area 1155 of the touch screen 280, for displaying the second data DATA2 related to the first electronic device 220 based on the movement MI of the first electronic device 220. For example, the second electronic device 250 may determine the first area 1155 based on a position where the touch input corresponding to the movement MI of the first electronic device 220 has been detected.

For example, when the position at which the touch input has been detected is included in the first reference area 1120 of the first electronic device 220, the first area 1155 may be determined based on the touched area (e.g., the size and direction of the touched area) of the touch screen 280 corresponding to the movement MI of the first electronic device 220. The first area 1155 may be located within the first reference area 1120 of the first electronic device 220.

The second electronic device 250 may display the second data DATA2 related to the first electronic device 220 in the first area 1155. Further, the second electronic device 250 may display the second data DATA2 based on the size and direction of the touched area corresponding to the movement MI of the first electronic device 220.

Figure 11C:
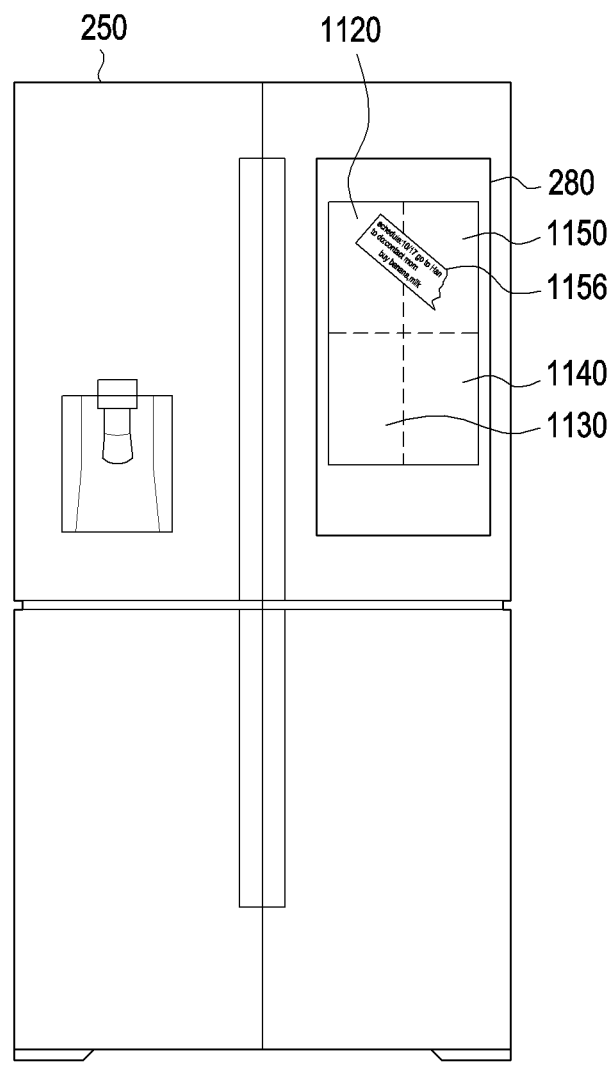

Referring to FIG. 11c, a first area 1156 may be located in the first reference area 1120 of the first electronic device 220, and the common area.

For example, when the position at which the touch input has been detected is included in the first reference area 1120 of the first electronic device 220 and the common area 1150, the first area 1156 may be determined based on the touched area (e.g., the size and direction of the touched area) corresponding to the movement MI of the first electronic device 220. The first area 1156 may be located in the first reference area 1120 of the first electronic device 220 and the common area.

Figure 11D:
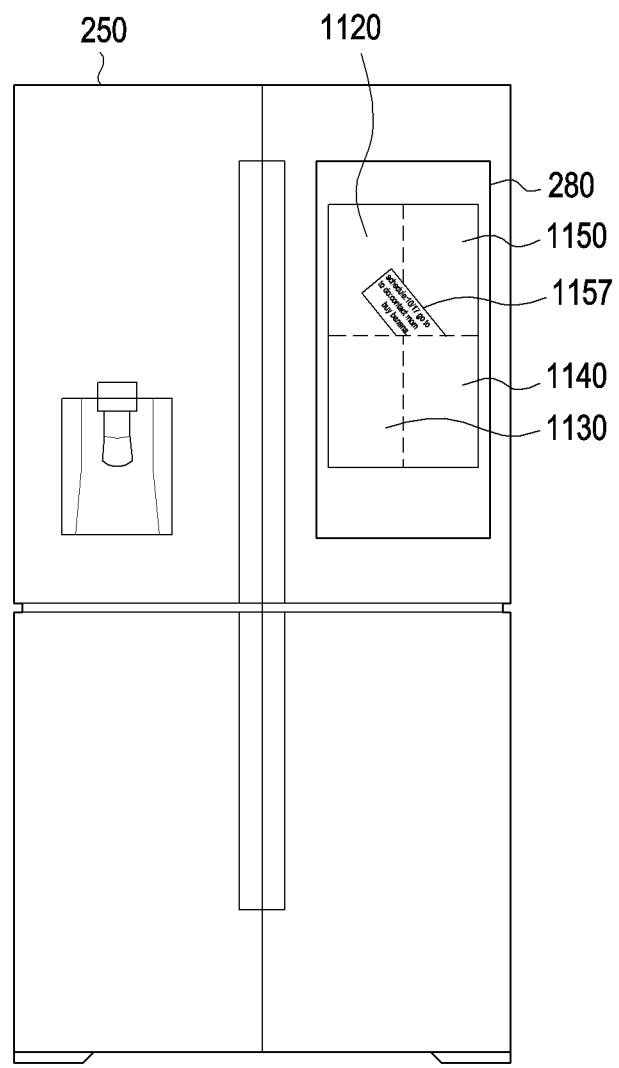

Referring to FIG. 11d, when a part of the position where the touch input has been detected is not included in the first reference area 1120 of the first electronic device 220 and the common area 1150, the first area 1156 may be determined based on the touched area (e.g., the size and direction of the touched area) of the touch screen 280 corresponding to the movement MI of the first electronic device 220. Herein, a first area 1157 may be located only within the first reference region 1120 of the first electronic device 220 and the common area.

Figure 11E:
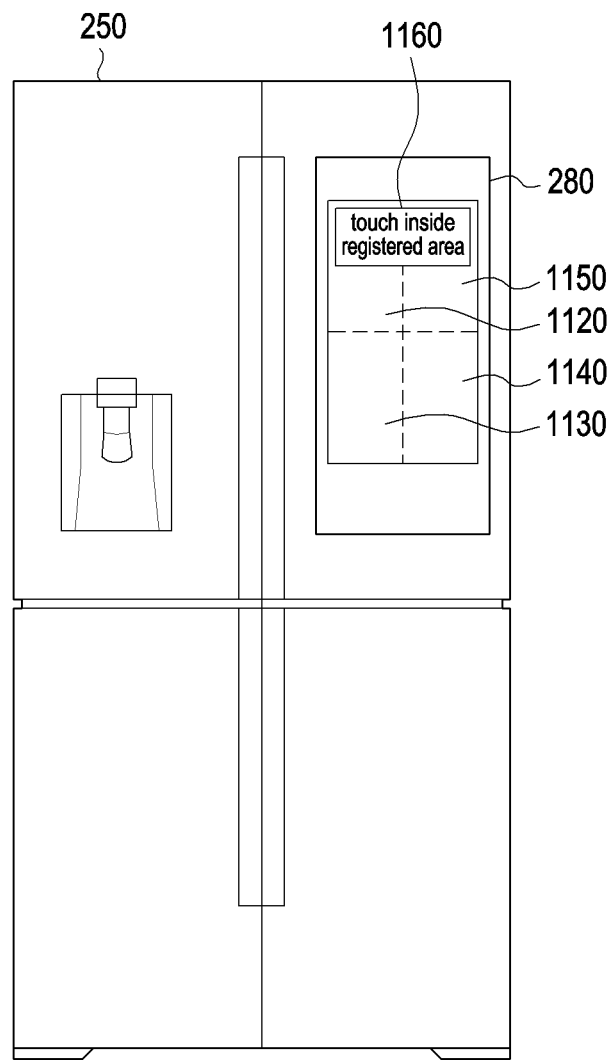

Referring to FIG. 11e, when the position at which the touch input has been detected is not included fully in the first reference area 1120 of the first electronic device 220 and the common area 1150, the second electronic device 250 may not determine a first area. Further, the second electronic device 250 may not display the second data DATA2 related to the first electronic device 220 on the touch screen 280.

Further, the second electronic device 250 may provide a notification 1160, "Touch inside registered area" through the touch screen 280.

Figure 12A:
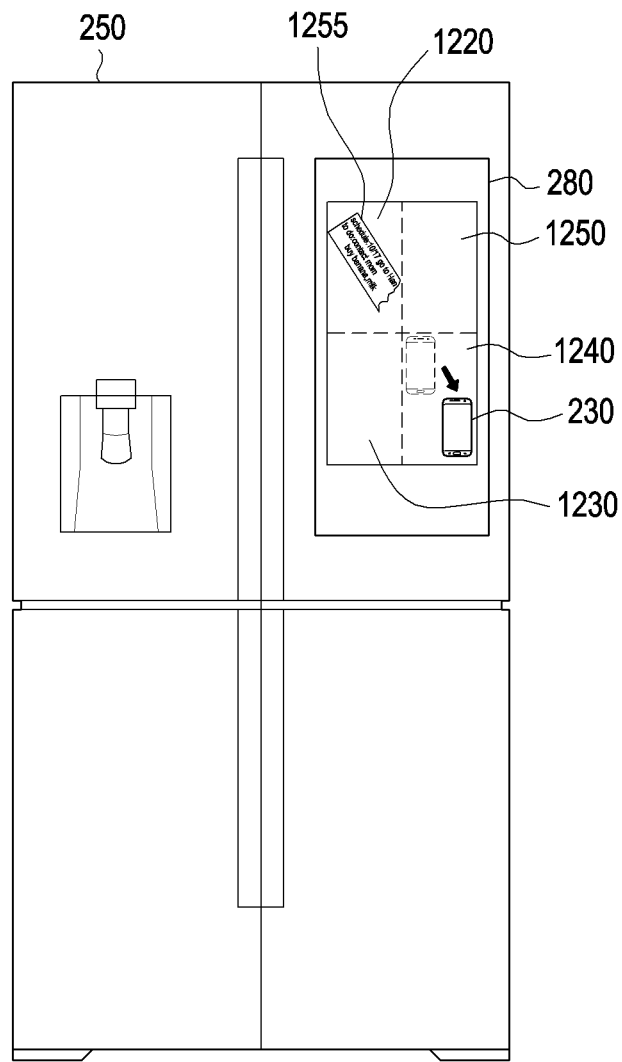
FIGS. 12a and 12b are block diagrams illustrating an operation of a first electronic device according to various embodiments of the present disclosure.
Figure 12B:
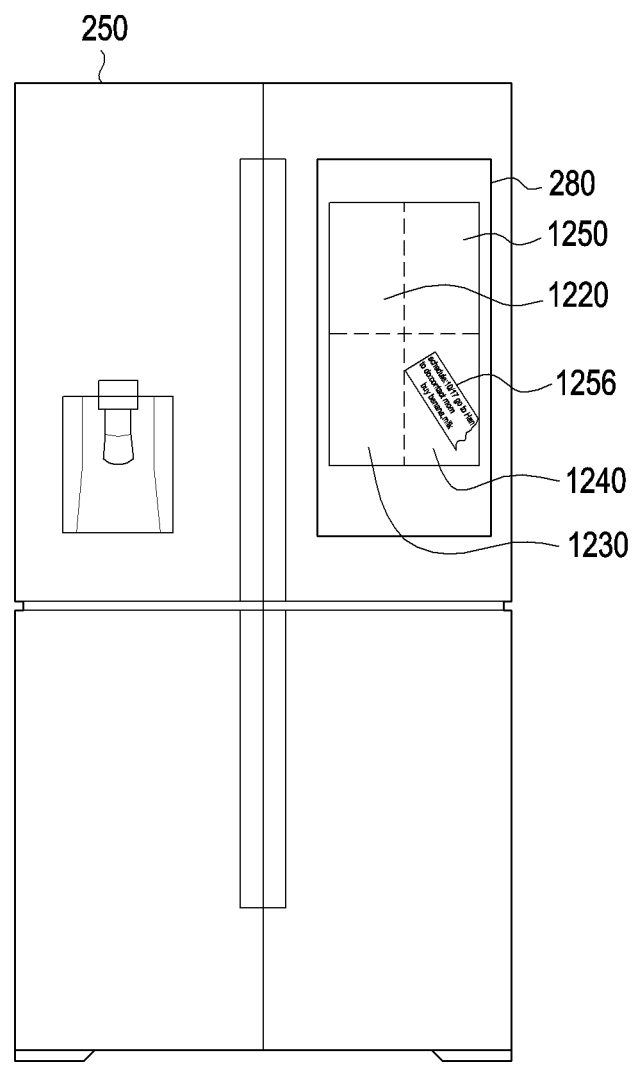

FIGS. 12a and 12b are block diagrams illustrating operations of a first electronic device according to various embodiments of the present disclosure.

Referring to FIG. 12a, the second electronic device 250 may display the second data DATA2 related to the first electronic device 220 in a first area 1255 of the touch screen 280.

When the third electronic device 230 approaches the second electronic device 250 (e.g., within a predetermined distance), the second electronic device 250 may recognize the third electronic device 230 based on the third data received from the third electronic device 230. When the third electronic device 230 has been recognized, the second electronic device 250 may obtain the fourth data related to the third electronic device 230.

The second electronic device 250 may detect a movement of the third electronic device 230 with respect to the touch screen 280. For example, the second electronic device 250 may detect a touch input corresponding to the movement of the third electronic device 230 with respect to the touch screen 280.

Referring to FIG. 12b, the second electronic device 250 may display the fourth data related to the third electronic device 230 in a second area 1256 of the touch screen 280 based on the movement of the third electronic device 230. For example, the second electronic device 250 may determine the second area 1256 based on a position at which the touch input corresponding to the movement of the third electronic device 230 has been detected.

For example, when the position at which the touch input has been detected is included in a second reference area 1240 of the third electronic device 220, the second area 1256 may be determined based on the touched area (e.g., the size and direction of the touched area) of the touch screen 280 corresponding to the movement of the third electronic device 230. The second area 1256 may be located within the second reference area 1240 of the third electronic device 230.

The second electronic device 250 may display the fourth data related to the third electronic device 230 in the second area 1256. Further, the second electronic device 250 may display the fourth data based on the size and direction of the touched area corresponding to the movement of the third electronic device 230.

Further, the second electronic device 250 may delete the second data DATA2 related to the first electronic device 220 displayed in the first area 1255 of the touch screen 280, while displaying the fourth data in the second area.

According to various embodiments of the present disclosure, a first electronic device may include a communication module, a touch screen, and a processor configured to receive, from a second electronic device registered to the first electronic device, first data indicating the second electronic device through the communication module, and display second data corresponding to the first data in a first area of the touch screen, corresponding to a movement of the second electronic device with respect to the touch screen, in response to the movement of the second electronic device.

The processor may set a plurality of areas corresponding to a plurality of electronic devices on the touch screen and set a reference area for displaying the second data related to the second electronic device among the plurality of areas.

The processor may compare the reference area with the first area corresponding to the movement of the second electronic device and display the second data in at least a part of the reference area according to a result of the comparison.

The processor may determine whether the second electronic device has been registered based on the first data and activate the reference area of the touch screen according to a result of the determination.

The processor may receive a touch input to the touch screen, corresponding to the movement of the second electronic device and display the second data in the first area corresponding to the touch input.

The first electronic device may further include a memory, and the processor may obtain the second data stored in the memory in response to the first data received from the first electronic device.

The processor may receive the second data by using the first data from the second electronic device through the communication module.

The processor may receive, from a third electronic device registered to the first electronic device, third data indicating the third electronic device through the communication module and display fourth data corresponding to the third data in a second area of the touch screen, corresponding to a movement of the third electronic device with respect to the touch screen, in response to the movement of the third electronic device.

The processor may delete the second data displayed in the first area and display the fourth data in the second area.

According to various embodiments of the present disclosure, a method of operating a first electronic device may include receiving first data indicating a second electronic device registered to the first electronic device from the second electronic device and displaying second data corresponding to the first data in a first area of a touch screen, corresponding to a movement of the second electronic device with respect to the touch screen, in response to the movement of the second electronic device.

The method of operating a first electronic device may further include setting a plurality of areas corresponding to a plurality of electronic devices on the touch screen, and setting a reference area for displaying the second data related to the second electronic device among the plurality of areas.

The displaying of second data may include comparing the reference area with the first area corresponding to the movement of the second electronic device, and displaying the second data in at least a part of the reference area according to a result of the comparison.

The reception of first data may include determining whether the second electronic device has been registered based on the first data and activating the reference area of the touch screen according to a result of the determination.

The displaying of second data may include receiving a touch input to the touch screen, corresponding to the movement of the second electronic device, and displaying the second data in the first area corresponding to the touch input.

The displaying of second data may include obtaining the second data stored in a memory of the first electronic device in response to the first data received from the first electronic device.

The displaying of second data may include receiving the second data by using the first data from the second electronic device.

The method of operating a first electronic device may include receiving, from a third electronic device registered to the first electronic device, third data indicating the third electronic device, and displaying fourth data corresponding to the third data in a second area of the touch screen, corresponding to a movement of the third electronic device with respect to the touch screen, in response to the movement of the third electronic device.

The displaying of fourth data may include deleting the second data displayed in the first area and displaying the fourth data in the second area.

According to various embodiments of the present disclosure, a first electronic device may include a communication module, and a processor configured to transmit first data indicating the first electronic device to a second electronic device to display information on a touch screen of the second electronic device, and transmit the second data to the second electronic device, so that the second electronic device displays second data corresponding to the first data in a first area of the touch screen, corresponding to a movement of the first electronic device.

The first area may be determined based on a touch input to the touch screen, corresponding to the movement of the first electronic device.

Each of the above-described components of the electronic device may include one or more components and may be named differently according to the type of the electronic device. According to various embodiments, one or more of the above-described components may be omitted, or one or more other components may be added in the electronic device. Further, a part of the components of the electronic device may be integrated into a single entity. In such a case, the integrated entity may still perform one or more functions of each of the plurality of components in the same or similar manner as they are performed by a corresponding one of the plurality of components before the integration.

The embodiments disclosed in the present specification are presented for the purpose of describing and understanding the disclosed technical contents, not limiting the scope of the present disclosure. Accordingly, the scope of the present disclosure should be construed as including all changes or various other embodiments based on the technical spirit of the present disclosure.

The invention claimed is:

1. A first electronic device comprising:
a communication module;
a touch screen; and
a processor configured to:
receive, from a second electronic device registered to the first electronic device, first data indicating the second electronic device through the communication module;
identify a continuous movement of a touch input or a hover input to the touch screen by the second electronic device,
in response to the continuous movement of the touch input or the hover input to the touch screen by the second electronic device inside of a predetermined area among an entire area of the touch screen, display second data corresponding to at least some of the first data in a first area of the touch screen, and
in response to the continuous movement of the touch input or the hover input to the touch screen by the second electronic device outside of the predetermined area among the entire area of the touch screen, display no data in the first area of the touch screen,
wherein the first area is an area detected by the continuous movement among the predetermined area of the touch screen.

2. The first electronic device of claim 1, wherein the processor is configured to set a plurality of areas corresponding to a plurality of electronic devices on the touch screen, and set a reference area for displaying the second data related to the second electronic device among the plurality of areas.

3. The first electronic device of claim 2, wherein the processor is configured to compare the reference area with the first area corresponding to a movement of the second electronic device, and display the second data in at least a part of the reference area according to a result of the comparison.

4. The first electronic device of claim 2, wherein the processor is configured to determine whether the second electronic device has been registered based on the first data, and activate the reference area of the touch screen according to a result of the determination.

5. The first electronic device of claim 1, wherein the processor is configured to receive a touch input to the touch screen, corresponding to a movement of the second electronic device, and display the second data in the first area corresponding to the touch input.

6. The first electronic device of claim 1, further comprising a memory,
wherein the processor is configured to obtain the second data stored in the memory in response to the first data received from the first electronic device.

7. The first electronic device of claim 1, wherein the processor is configured to receive the second data by using the first data from the second electronic device through the communication module.

8. The first electronic device of claim 1, wherein the processor is configured to receive, from a third electronic device registered to the first electronic device, third data indicating the third electronic device through the communication module, and display fourth data corresponding to the third data in a second area of the touch screen, corresponding to a movement of the third electronic device with respect to the touch screen, in response to the movement of the third electronic device.

9. The first electronic device of claim 8, wherein the processor is configured to delete the second data displayed in the first area, and display the fourth data in the second area.

10. A method of operating a first electronic device, the method comprising:
receiving first data indicating a second electronic device registered to the first electronic device from the second electronic device;
identifying a continuous movement of a touch input or a hover input to a touch screen of the first electronic device by the second electronic device;
in response to the continuous movement of the touch input or the hover input to the touch screen by the second electronic device inside of a predetermined area among an entire area of the touch screen, displaying second data corresponding to at least some of the first data in a first area of the touch screen; and
in response to the continuous movement of the touch input or the hover input to the touch screen by the second electronic device outside of the predetermined area among the entire area of the touch screen, displaying no data in the first area of the touch screen,
wherein the first area is an area detected by the continuous movement among the predetermined area of the touch screen.

11. The method of claim 10, further comprising:
setting a plurality of areas corresponding to a plurality of electronic devices on the touch screen, and
setting a reference area for displaying the second data related to the second electronic device among the plurality of areas.

12. The method of claim 11, wherein the displaying of the second data comprises comparing the reference area with the first area corresponding to a movement of the second electronic device, and displaying the second data in at least a part of the reference area according to a result of the comparison.

13. The method of claim 11, wherein the receiving of the first data comprises determining whether the second electronic device has been registered based on the first data, and activating the reference area of the touch screen according to a result of the determination.

14. The method of claim 10, wherein the displaying of the second data comprises:
receiving a touch input to the touch screen, corresponding to a movement of the second electronic device; and
displaying the second data in the first area corresponding to the touch input.

15. The method of claim 10, wherein the displaying of the second data comprises obtaining the second data stored in a memory of the first electronic device in response to the first data received from the first electronic device.

* * * * *